United States Patent [19]

Elder et al.

[11] Patent Number: 5,492,104

[45] Date of Patent: Feb. 20, 1996

[54] EXHAUST GAS RECIRCULATION FOR AN INTERNAL COMBUSTION ENGINE

[75] Inventors: Jack E. Elder, Rochester; Karl F. Barr, Jr., Grosse Pointe Park, both of Mich.

[73] Assignee: General Motors Corporation, Detroit, Mich.

[21] Appl. No.: 334,619

[22] Filed: Nov. 3, 1994

[51] Int. Cl.$^6$ ................................................ F02B 47/08
[52] U.S. Cl. ............................................. 123/568; 285/200
[58] Field of Search ............................. 123/568; 285/47, 285/200

[56] References Cited

U.S. PATENT DOCUMENTS 5,425,347  6/1995  Zinke, II ........................... 123/568

OTHER PUBLICATIONS

WO 94/01673, Vaudry, published Jan. 1994; Sheet Drawings 1–3.
Automotive Engineering, "Design of an EGR interface", May 1993, pp. 15–19.

Primary Examiner—Noah P. Kamen
Attorney, Agent, or Firm—Karl F. Barr, Jr.

[57] ABSTRACT

An EGR transfer assembly includes a tubular conduit having a first end in communication with a source of exhaust gas and a second end located in an oversized opening in the engine intake manifold. A seal carrier configured as a cylindrical sleeve having a flanged portion at one end, is received over the second end of the conduit such that the cylindrical portion is inserted into the opening in circumjacent relationship to the conduit to define an insulating space therebetween. The flanged portion of the carrier limits the entry of the cylindrical sleeve into the manifold by seating against the manifold. Seals are disposed between the sleeve and the conduit and between the flange and the manifold to limit the leakage of air through the manifold opening. A spring member is seated between the seal carrier and a stop member and acts to seat the flanged portion against the manifold. Forces exerted on the carrier from air pressure within the manifold may exceed the closing force exerted by the spring member causing the seal carrier to move from its sealed, seated position against the manifold to vent pressure from within the manifold through the opening.

7 Claims, 5 Drawing Sheets

EXHAUST GAS RECIRCULATION FOR AN INTERNAL COMBUSTION ENGINE

TECHNICAL FIELD

The invention relates to a system for supplying exhaust gas to the intake manifold of an internal combustion engine and, particularly, to an exhaust gas transfer assembly which is compatible with thermoplastic intake manifolds and equalizes intake system pressure.

BACKGROUND

Intake manifolds for internal combustion engines used in automotive applications have typically been manufactured with metallic materials such as cast iron or alloys of aluminum or magnesium having high temperature durability. Weight and manufacturing concerns have given way to the use of thermoplastics on engines. When used in the construction of intakes, weight is significantly reduced and, in many cases, performance is improved as a result of precise control of interior finish and reduced heat transfer to the inlet air.

Incorporation of recirculated exhaust gas (EGR) to intake manifolds manufactured using thermoplastics is a principle design challenge as exhaust gas temperatures must be maintained at temperatures which often exceed design specifications of the thermoplastic material. With metallic manifolds, EGR conduits may be attached directly to the manifold EGR inlet with little concern. Thermoplastic manifolds require cooling of the exhaust gas or insulation between the EGR inlet and the supply conduit.

Additional automotive design criteria require that under hood components utilize a minimum of space due to the proliferation of components packaged therein. Traditional EGR supply systems include a steel tube assembly, encased in an insulating material to protect surrounding componentry. The tube includes an attachment flange at each end for communication with the exhaust gas supply and the intake air manifold. The assembly is routed through the engine compartment and is, by nature, expensive and bulky.

Additionally, engine intake manifolds may have precise intake pressure parameters which, necessarily, are to be maintained in order to avoid performance and durability penalties. In such instances, intake manifolds may incorporate pressure valves in order to maintain intake pressures within desirable ranges. The pressure valves add to the complexity and cost of the intake manifolds.

SUMMARY

The present invention provides an EGR transfer assembly which is compatible with intake manifolds constructed of thermoplastic materials having temperature limitations which are lower than those of metallic materials. The transfer assembly is especially applicable to engines having an EGR manifold located in a spaced, but adjacent relationship to the intake manifold. The use of the present invention in such engine applications minimizes engine compartment space required for EGR supply. Flexibility of the present design, however, allows application of the transfer assembly to traditional EGR conduits. In addition to thermoplastic material compatibility, the present design may be used to limit intake pressure in applications where intake pressure maintenance requires the use of a pressure valve.

In an EGR transfer assembly according to a preferred embodiment of the present invention, an internal combustion engine includes an EGR supply manifold located in spaced, adjacent proximity to an air intake manifold. Am EGR conduit has an end located in an opening of the EGR manifold and a second end passing through a corresponding, oversized opening in the intake manifold. A seal carrier configured as a flanged cylindrical sleeve, mounts over the EGR conduit in the space between the intake and exhaust manifolds. The sleeve is oriented such that the cylindrical portion of the sleeve enters the intake manifold through an annular space defined by the conduit and the oversized manifold opening, with the flanged portion limiting the intrusion of the sleeve by contacting the outer surface of the manifold. The sleeve establishes an insulating space between the EGR conduit and the intake manifold and a seal disposed between the sleeve and the conduit prevent leakage of unmetered air through the insulating space to the intake. A second seal located between the flange and the intake manifold outer surface similarly inhibits leakage between the sleeve and the oversized opening in the intake manifold.

The EGR transfer assembly is positively located against and within the intake manifold through the use of a biasing member disposed between the flanged sleeve and the EGR manifold. The spring assures the integrity of the seal at the flange/manifold interface. In instances where intake manifold pressure maintenance is required, the spring can be chosen with a biasing force which will allow movement of the flanged sleeve partially out of the oversized opening in the manifold under the force of internal intake pressure. As a consequence of the sleeve movement, the face seal between the flanged portion of the sleeve and the manifold will be interrupted allowing pressure venting of the intake between the sleeve and the intake manifold opening. Upon normalization of intake system pressure, the spring will operate to return the sleeve to its normally sealed position with respect to the intake manifold avoiding interruption in engine operation. The details, as well as other features and advantages of the EGR transfer assembly of this invention are set forth in the following detailed description and drawings.

DETAILED DESCRIPTION OF THE PREFERRED EMBODIMENTS

Figure 1:
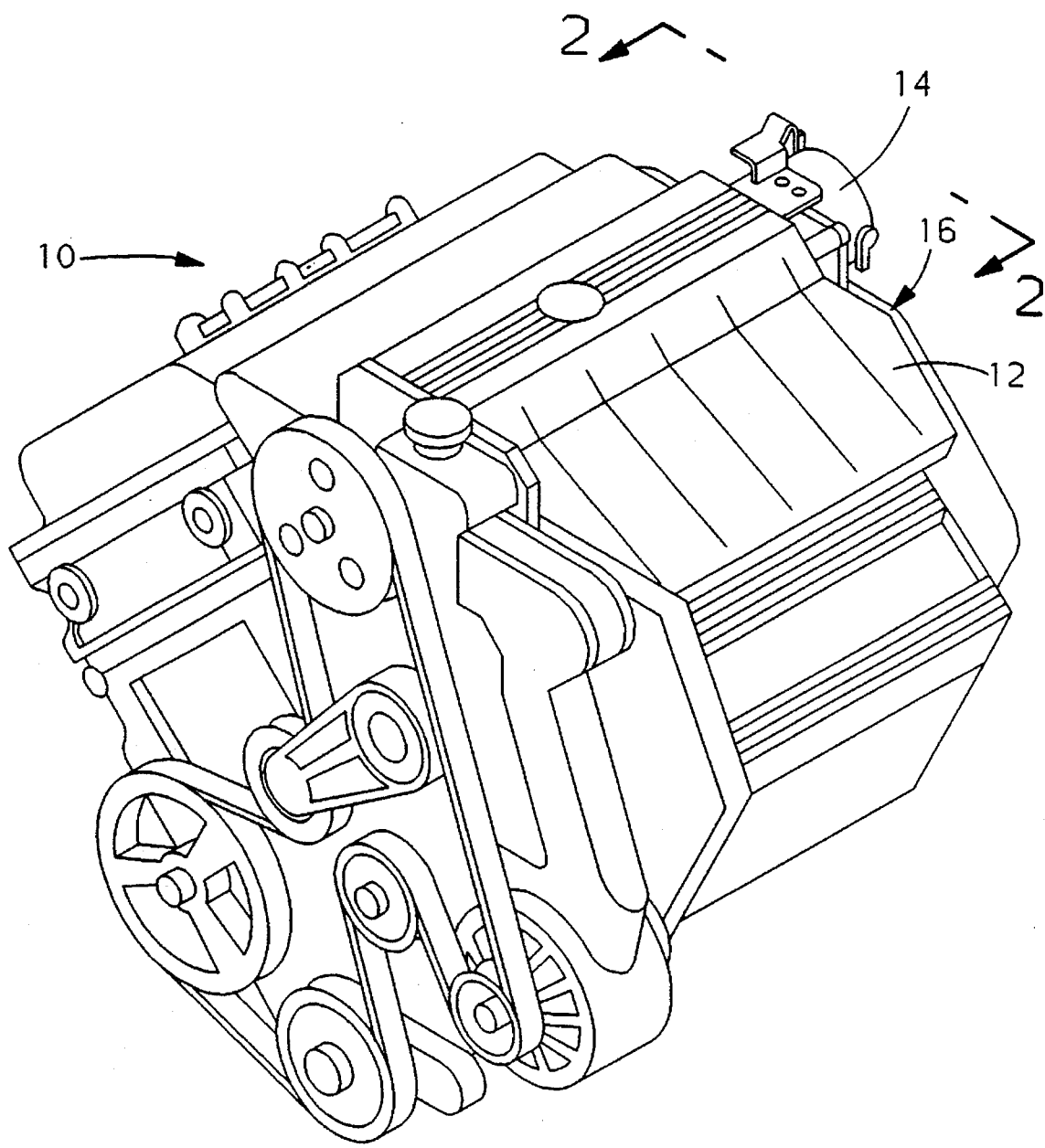
FIG. 1 is an environmental, perspective view of an internal combustion engine embodying the present invention.
Figure 2:
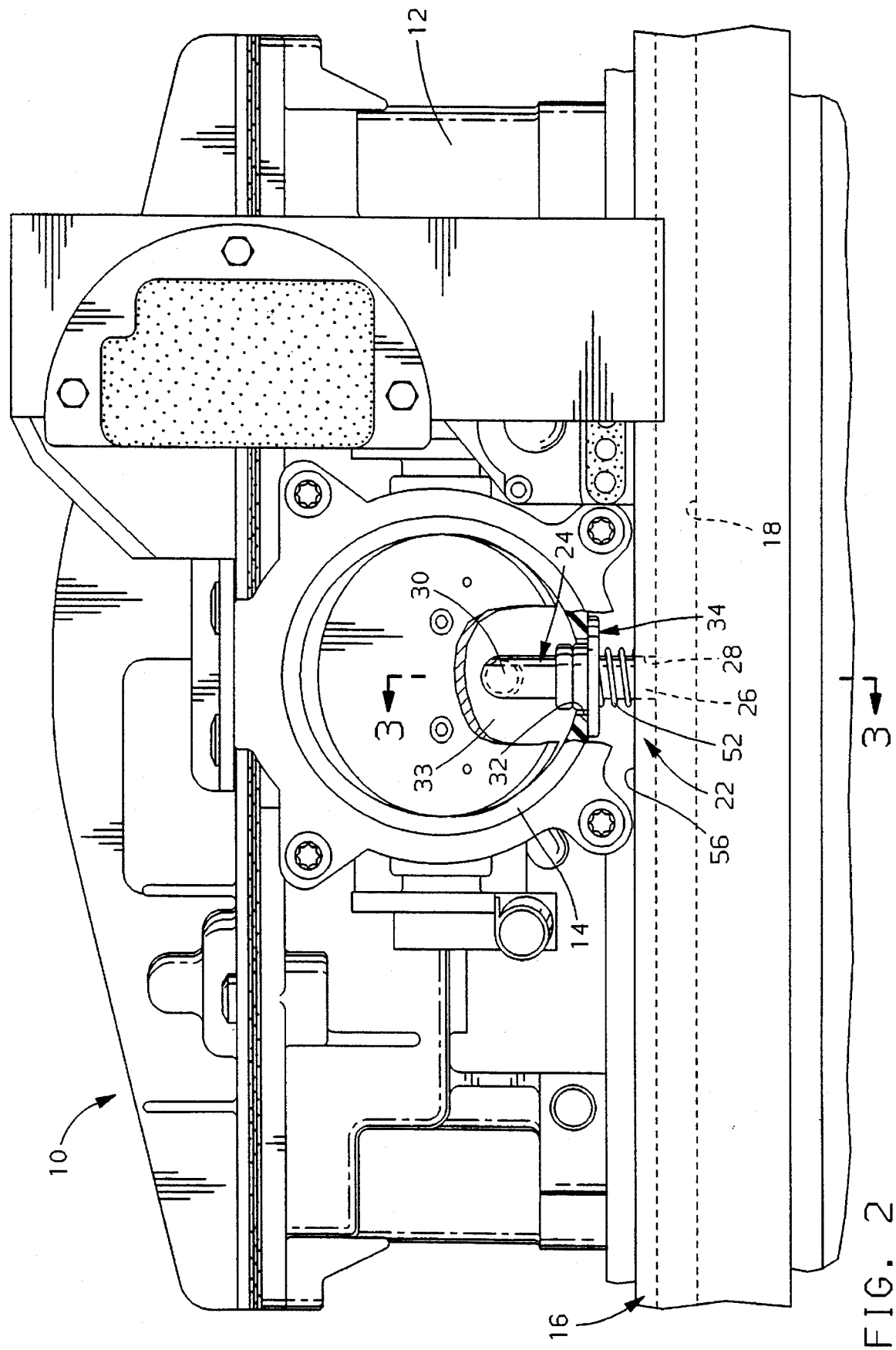
FIG. 2 is a partial front view of the engine of FIG. 1, taken along line 2—2, with parts broken away.

Referring to the drawings, FIG. 1 illustrates an internal combustion engine, designated generally as 10, having an intake manifold 12 which operates through throttle body 14 to distribute combustion air to the engine cylinders, not shown. In the engine 10, the intake manifold 12 is constructed of a lightweight, high temperature thermoplastic such as poly-amide 66 (nylon 66). For the application of the present invention, however, the intake manifold material need not be limited to a plastic material but may also include traditional materials such as steel, aluminum or magnesium. In addition to the intake manifold 12, the engine 10 includes an EGR manifold 16 which, in the engine shown, traverses the upper portion of the engine and includes an integral passage 18 which communicates with a source of engine exhaust gas. In addition to exhaust gas, the EGR manifold 16 may also contain engine coolant passages 20, FIGS. 3 and 4. The placement of coolant and EGR in a single manifold simplifies engine packaging and assembly by eliminating the need for separate crossovers. Additionally, the movement of the coolant through the EGR manifold 16 may be used to lower the temperature of the exhaust gas prior to its injection into the intake air stream. As shown in FIG. 2, at least a portion of the intake manifold 12 lies in a closely spaced relationship with the EGR manifold 16.

Figure 3:
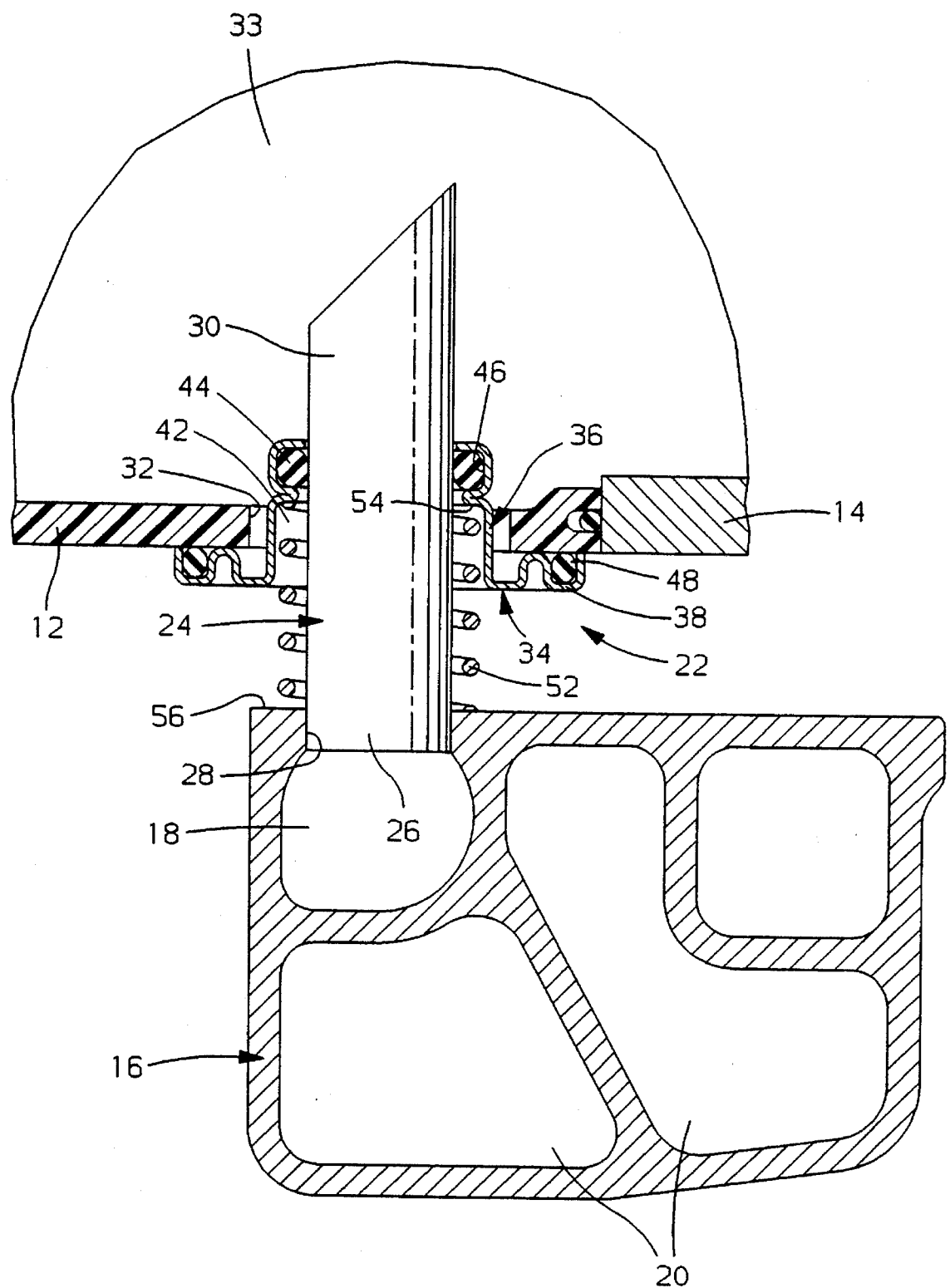
FIG. 3 is a partial sectional view taken along line 3—3 of FIG. 2.

Referring now to FIGS. 2 and 3, an EGR transfer assembly 22 is shown extending between the exhaust gas passage 18 of the EGR manifold 16, and the intake manifold 12. The transfer assembly 22 includes an EGR conduit 24 which is preferably a stainless steel tube. The EGR conduit 24 has an end 26 which, in the embodiment shown, is press-fit into an opening 28 in the EGR manifold 16 such that the conduit 24 communicates with the exhaust gas passage 18. A second end 30 of the EGR conduit 24 passes through an oversized opening 32, having a diameter larger than that of the conduit 24, in the wall of the intake manifold 12. The oversized opening 32 eases off insertion of the conduit end 30 into the manifold 12 and assures that the conduit will not contact the edge of opening 32.

A seal carrier 34 is configured as a cylindrical flanged sleeve having a cylindrical portion 36 and a flanged portion 38 at one end thereof. Seal carrier 34 is slidingly received over the EGR conduit 24 such that it is disposed in the space between the intake manifold 12 and the EGR manifold 16. The sleeve is oriented such that the cylindrical portion 36 enters the intake manifold 12 through the annular space which is defined between the EGR conduit 24 and the edge of the oversized opening 32. The flanged portion 38 of the seal carrier 34 limits the insertion of the sleeve portion 36 into the intake manifold by contacting the outer surface thereof. The cylindrical portion 36 of the seal carrier 34 establishes an insulating space 42 between the EGR conduit 24 and the opening 32 to thereby minimize the heat transfer from the conduit to the thermoplastic manifold. A seal member 44 is located in a cavity 46 formed in the stamped metal seal carrier 34 and is operable to establish a seal between the cylindrical portion 36 of the carrier and the EGR conduit 24, thereby preventing leakage of unmetered air through the insulating space 42 to the intake 33. A second seal member 48 is disposed between the flanged portion 38 of the seal carrier 34 and the outer surface of the intake manifold 12 and similarly inhibits leakage between the seal carrier 34 and the oversized opening 32. As FIG. 3 illustrates, the length of the cylindrical portion 36 of the seal carrier 34 is chosen such that the critical seal 44 between the sleeve 36 and the EGR conduit 24, where temperatures are expected to be high, is located in the flow of cool inlet air charge entering the intake 33. Location of the seal member 44 in the air flow enhances seal reliability and durability.

The seal carrier 34 is positively located against and within the intake manifold 12 through the use of a biasing member, such as compression spring 52, disposed between a spring seat 54 in the cylindrical portion 36 of the seal carrier 34 and a stop which, in the preferred embodiment described thus far, is the upper surface 56 of EGR manifold 16. The spring 52 maintains the flanged portion 38 of the seal carrier 34, and its respective seal member 48, in contact with the outer surface of the intake manifold 12 thus assuring the integrity of the face seal at the flange/manifold interface.

Figure 4:
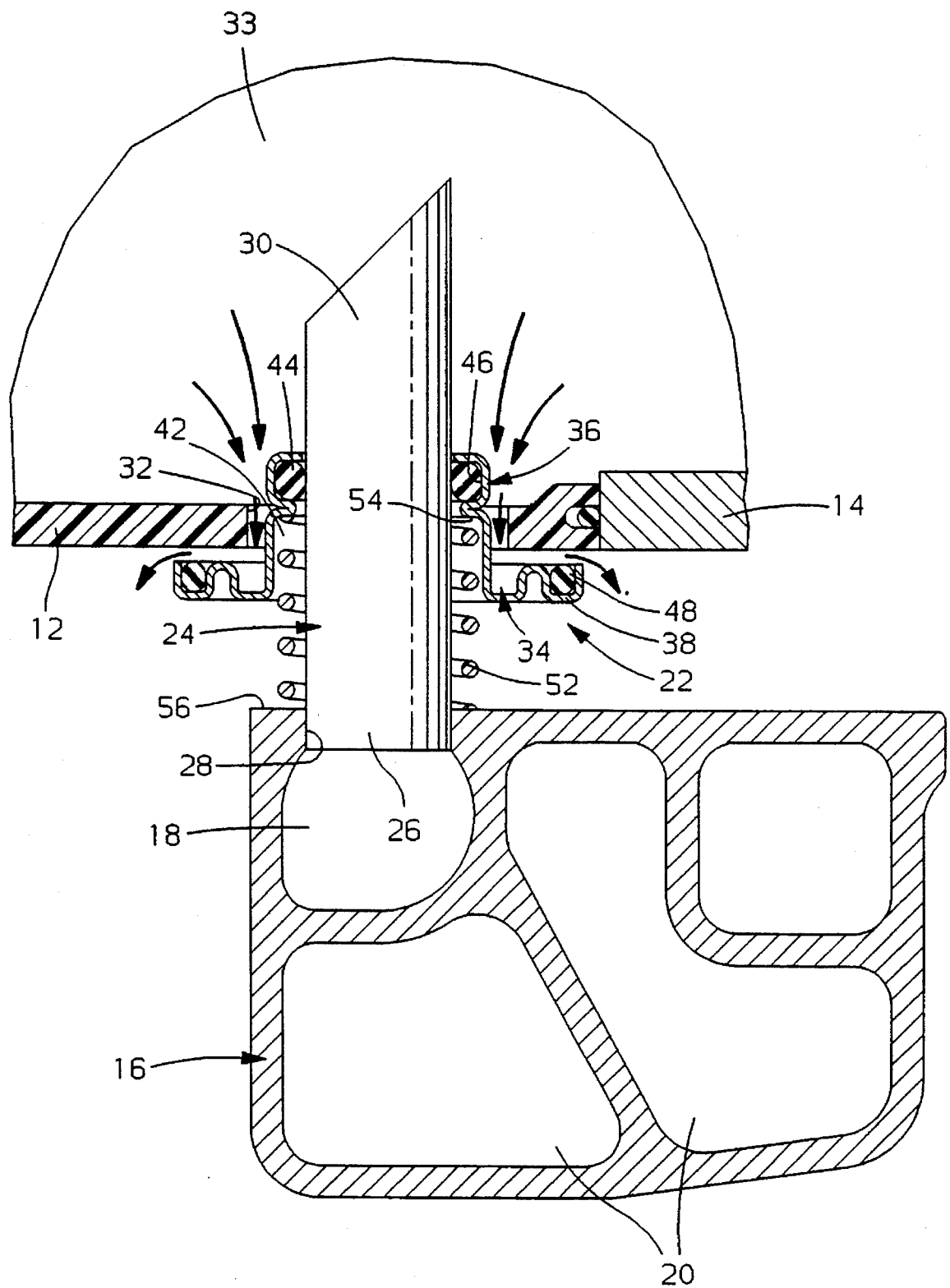
FIG. 4 illustrates the apparatus of FIG. 3 shown in a second mode of operation.

The use of spring member 52 to locate the seal carrier 34 with respect to EGR conduit 24 and intake manifold 12 allows the EGR transfer assembly to operate as a pressure management valve in instances where intake manifold pressure maintenance is desirable. Pressure within the inlet chamber 33 of the intake manifold 12 is operable on the flanged portion 38 of the seal carrier 34 to push the carrier, against the bias of spring 52, out of the manifold opening 32. The rate of spring 52 can be chosen to maintain the seal carrier 34 in the sealed position described above, until a predetermined pressure in the manifold inlet chamber 33 is exceeded, at which time the force exerted on the carrier 34 by the pressure in the manifold will overcome the spring force exerted by the spring 52 causing the flanged sleeve of the carrier 34 to move outwardly of the manifold opening 32 along the EGR conduit 24. As the seal carrier moves under the force of internal manifold pressure, the face seal between the flanged portion of the seal carrier and its associated seal member 48, and the outer surface of the intake manifold 12 will be interrupted, as shown in FIG. 4, allowing pressure venting of the inlet chamber 33 to occur between the seal carrier 34 and the manifold opening 32. Venting will continue until the intake system pressure diminishes to a level at which the force exerted by spring 52 returns the carrier 34 to its normally seated and sealed position against the intake manifold 12.

While the EGR transfer assembly described thus far has focused on an engine application having specific features, the invention need not be so narrowly described, or applied. A second embodiment of the EGR transfer assembly is shown in FIG. 5, in which similar features to those described above, with reference to the first embodiment, are represented by the same numbers.

Figure 5:
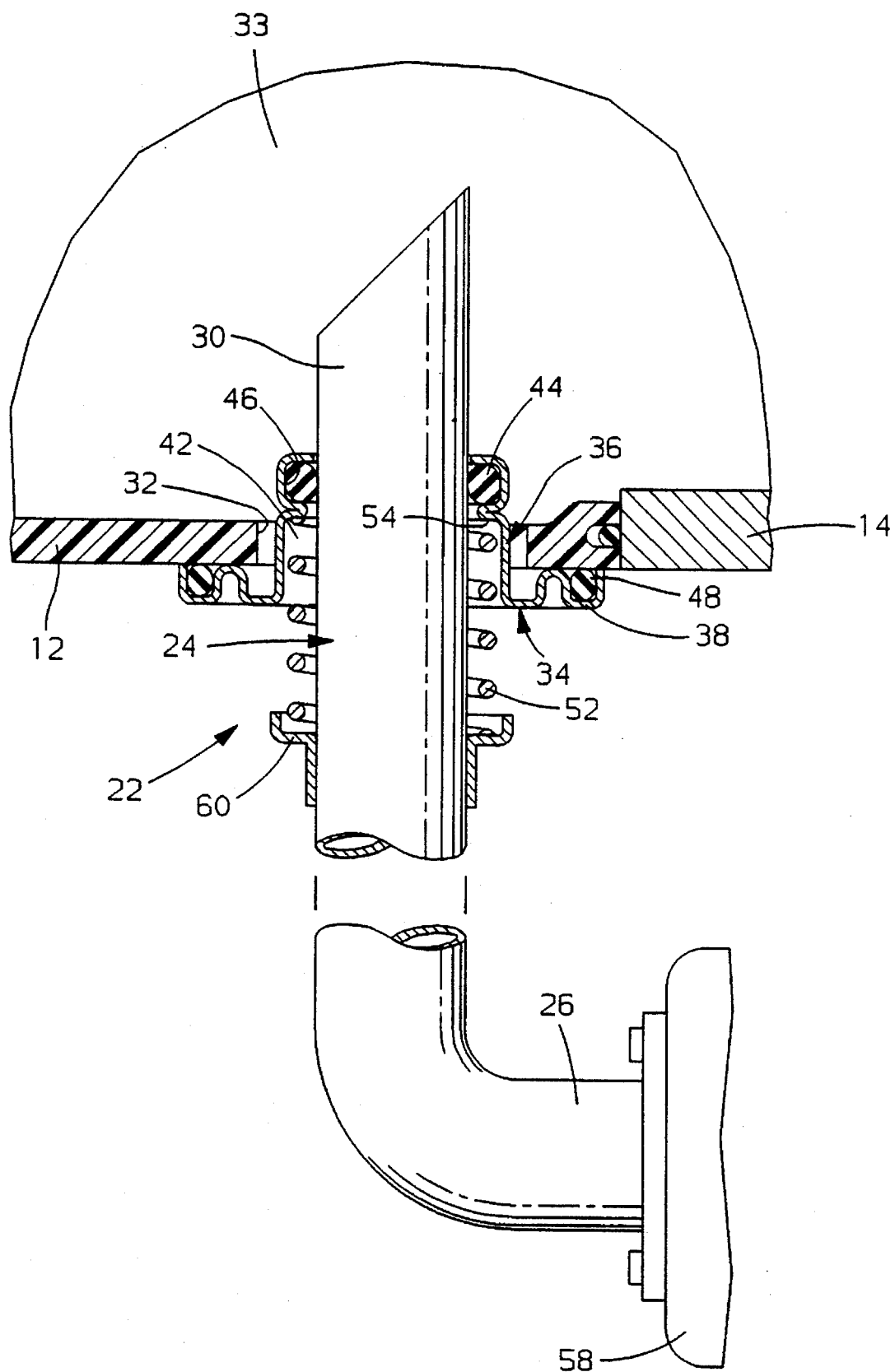
FIG. 5 is a view similar to that of FIG. 3, illustrating a second embodiment of the invention.

In FIG. 5, the internal combustion engine 10 utilizes an air intake manifold 12 which operates through throttle body 14 to distribute air to the engine cylinders. Exhaust gas destined for recirculation to the intake 33 is supplied to the manifold from a remote source, such as the exhaust manifold 58 or other portion of the vehicle exhaust system. An EGR transfer assembly 22 extends between the remote exhaust source and the intake manifold 12. The transfer assembly 22 includes an EGR conduit 24 having a first end 26 in communication with the engine exhaust manifold 58 and a second end 30 configured to pass through the oversized opening 32 in the wall of the intake manifold 12. The oversized opening 32 has a diameter larger than the outer diameter of the EGR conduit 24 to ease insertion of the conduit end 30 into the manifold 12 and to assure that the conduit will not contact the edge of the manifold opening 32 in the case of a manifold constructed of a polymeric materia.

Seal carrier 34, configured as a cylindrical sleeve 36 having a flanged portion 38 at one end, is slidingly received over the EGR conduit 24 such that the cylindrical portion 36 enters the intake manifold 12 through the annular space which is defined between the first end 30 of the EGR conduit 24 and the edge of the oversized opening 32 in the manifold. The flanged portion 38 of the seal carrier 34 limits the insertion of the cylindrical sleeve portion 36 into the manifold 12 by contacting the manifold outer surface. The cylindrical portion 36 of the seal carrier 34 establishes an insulating space 42 between the EGR conduit 24 and the intake manifold 12 to thereby minimize the heat transferred from the conduit to the manifold. A seal member 44 is located in an annular groove 46 defined by the cylindrical sleeve 36 and operates to establish a seal between the sleeve portion 36 and the EGR conduit 24. The seal member 44 prevents leakage of unmetered air through the insulating space 42 to the engine intake 33. A second seal member 48 is disposed between the flanged portion 38 of the seal carrier 34 and the outer surface of the intake manifold 12 and similarly inhibits leakage between the seal carrier 34 and the oversized opening 32 in the intake manifold 12.

The seal carrier 34 is positively located against and within the intake manifold 12 through the use of a biasing member, such as the compression spring 52. The spring member 52 is disposed between an integral spring seat 54 defined by the cylindrical sleeve portion 36 of the carrier 34 and a spring stop 60 located integral with the EGR conduit 24. The spring stop 60 is spaced from the second end 30 of the conduit 24 and may comprise an annular flange which is welded, or otherwise fixed thereto. The spring maintains the flanged portion 38 of the seal carrier 34, and its respective seal member 48, in contact with the outer surface of the intake manifold 12 thus assuring the integrity of the seal at the flange/manifold interface. The spring rate of spring member 52 can be chosen to maintain the seal carrier in the described, sealed position, until a predetermined pressure in the intake manifold 12 is exceeded. When the intake pressure exceeds a desired value the pressure within the intake manifold operates to push the carrier 34, against the bias of the spring 52, out of manifold opening 32. As the seal carrier 34 moves under the force of internal manifold pressure, the seal 48 between the flanged portion 38 of the seal carrier 34 and the outer surface of the intake manifold 12 will be interrupted, allowing pressure venting of the inlet chamber 33 in a manner similar to that shown in FIG. 4.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiments may be modified in light of the above teachings. The embodiments described were chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

The embodiments of the invention in which an exclusive property or privilege is claimed are defined as follows:

1. A conduit for transferring exhaust gas to the intake manifold of an internal combustion engine comprising a tubular conduit having a first end in communication with a source of exhaust gas and a second end located in an opening in said intake manifold, said opening having a diameter larger than the diameter of said tubular conduit, a seal carrier comprising a cylindrical sleeve and a flanged portion at an end of said sleeve, said seal carrier slidingly received over said second end of said tubular conduit with said cylindrical sleeve located in said manifold opening in a circumjacent relationship to said conduit and said flanged portion seated against said manifold to limit the entry of said cylindrical portion therein, a seal member disposed between said cylindrical portion of said seal carrier and said tubular conduit and between said flanged portion of said seal carrier and said manifold to limit ingress of air to said manifold through said opening therein and a biasing member disposed between said seal carrier and a stop, operable to maintain said carrier in said manifold opening.

2. A conduit assembly for transferring exhaust gas to the intake manifold of an internal combustion engine comprising a tubular conduit having a first end in communication with a source of exhaust gas and a second end located in an opening in said intake manifold, said opening having a diameter larger than the diameter of said tubular conduit to define an annular space therebetween, a seal carrier comprising a cylindrical sleeve having a flanged portion at one end thereof, said seal carrier slidingly received over said second end of said tubular conduit with said cylindrical sleeve located in said annular space in a circumjacent relationship to said conduit and said flanged portion seated against said manifold to limit the entry of said cylindrical portion therein, a seal member disposed between said cylindrical portion of said seal carrier and said tubular conduit and between said flanged portion of said seal carrier and said manifold to limit the ingress of air to said manifold through said opening therein, and a biasing member disposed between said seal carrier and a stop, operable to exert a biasing force on said seal carrier to seat said cylindrical sleeve in said manifold opening and said flange member against said manifold, and operable to allow said seal carrier to move outwardly of said manifold opening, along said conduit, under the influence of a pressure force inside said manifold, said carrier operable to vent said pressure force through said manifold opening.

3. A conduit assembly for transferring exhaust gas to the intake manifold of an internal combustion engine, as defined in claim 2, said biasing member stop comprising an upper surface of said engine located in spaced adjacent relationship to said intake manifold.

4. A conduit assembly for transferring exhaust gas to the intake manifold of an internal combustion engine, as defined in claim 2, said biasing member stop comprising an annular flanged member fixed to said tubular conduit.

5. A conduit assembly for transferring exhaust gas from an engine mounted exhaust manifold to the intake manifold comprising a tubular conduit having a first end fixed in an opening in said exhaust manifold, said conduit in communication with exhaust gas in said conduit, and a second end located in an opening in said intake manifold, said opening having larger diameter than that of said tubular conduit to define an annular space therebetween, a seal carrier comprising a cylindrical sleeve having an outwardly flanged portion at one end, said seal carrier slidingly received over said tubular conduit and having said cylindrical sleeve located in said annular space in circumjacent relationship to said conduit to define an insulating air space therebetween, and said flanged portion of said seal carrier seated against said manifold to limit the entry of said cylindrical portion therein, a seal member disposed between said cylindrical portion of said seal carrier and said tubular conduit in said insulating air space to limit the ingress of air to said manifold through said space and a seal member disposed between said flanged portion of said seal carrier and said manifold to limit the ingress of air to said manifold between said carrier rand said manifold opening, and a biasing member disposed between said seal carrier and a stop member and operable to exert a biasing force on said seal carrier to thereby seat said cylindrical sleeve in said manifold opening and said flange member against said manifold, and operable to allow said seal carrier to move off of said seated and sealed position relative to said manifold opening under the influence of a pressure force inside said manifold, and to vent said pressure through said manifold opening.

6. A conduit assembly for transferring exhaust gas to the intake manifold of an internal combustion engine, as defined in claim 5, said biasing member stop comprising an upper surface of said engine located in spaced adjacent relationship to said intake manifold.

7. A conduit assembly for transferring exhaust gas to the intake manifold of an internal combustion engine, as defined in claim 5, said biasing member stop comprising an annular flanged member fixed to said tubular conduit.

* * * * *